(12) United States Patent
Yang

(10) Patent No.: US 6,700,832 B2
(45) Date of Patent: Mar. 2, 2004

(54) METHOD AND APPARATUS FOR PASSIVE ACOUSTIC IMAGING USING A HORIZONTAL LINE ARRAY

(75) Inventor: Tsih Yang, Great Falls, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/172,951

(22) Filed: Jun. 18, 2002

(65) Prior Publication Data

US 2003/0231547 A1 Dec. 18, 2003

(51) Int. Cl.[7] .............................................. G03B 42/06
(52) U.S. Cl. ......................................................... 367/11
(58) Field of Search ................................ 367/119, 103, 367/138, 11

(56) References Cited

U.S. PATENT DOCUMENTS

| | | | |
|---|---|---|---|
| 5,581,495 A | 12/1996 | Adkins et al. | |
| 5,822,276 A | 10/1998 | Miklovic | |
| 5,914,912 A | 6/1999 | Yang | |
| 6,009,045 A | 12/1999 | Yang et al. | |
| 6,198,693 B1 | 3/2001 | Marash | |

*Primary Examiner*—Daniel T. Pihulic
(74) *Attorney, Agent, or Firm*—John J. Karasek; L. George Legg (57) ABSTRACT

An apparatus for processing passive acoustic signals received on a horizontal line array that were either emitted from an underwater object or echo returned from an object, is proposed to display a radar-like range-bearing image of the object, thereby showing the location of the object relative to the receiver horizontal line array. The range-bearing images can be created at different water depth to search for an underwater object in a three-dimensional space. The method includes receiving an acoustic signal from the target, determining a beam covariance matrix, determining a replica field for a range-bearing of the target, determining a replica beam from the replica field; and processing the beam covariance matrix and the replica beam to determine range-bearing ambiguity surface and estimate depth ambiguity for selected peaks of the ambiguity surface.

20 Claims, 7 Drawing Sheets

FIGURE 1

CONCEPT OF OPS $$\sum_m \psi_m(z)\psi_m(z_S)$$

*Depth Response*

$z_S$ : Deep   Shallow

METHOD AND APPARATUS FOR PASSIVE ACOUSTIC IMAGING USING A HORIZONTAL LINE ARRAY

BACKGROUND OF THE INVENTION

1. Field of the Invention

This invention relates to acoustic imaging, and more particularly, to an apparatus and method for processing passive acoustic signals received on a horizontal line array using a reduced beam space processor.

2. Description of Related Art

Signal processing in underwater acoustics has been centered around the problem of detection and localization of a target or signal in an ocean waveguide. Detection and localization of a quiet target requires the use of an array of hydrophones as the array processing gain will enhance the signal-to-noise (S/N) ratio of the target. Standard array processing assumes that the signal arrives as a plane wave. Conventional beamforming uses the concept of delay and sum of received plane wave signals to estimate the target bearing. With the advent of matched field/mode processing it is possible to extend the detection range by exploiting the multipath arrivals of low frequency signals using, for example, a large aperture vertical or horizontal array.

Improved signal gain is obtained because matched field processing matches the data with signal propagation in the waveguide. Matched field processing may also be used for source localization. The parameter estimation aspect of the method has been extensively investigated. Assuming that the acoustic environment of the ocean is known and the signal can be modeled for all source ranges and depth of interest, the bearing, range, and depth of the target is estimated by the highest correlation point in the correlation ambiguity function. If the correlation is in terms of the mode amplitudes of the replica and data field, one has a matched-mode processing.

For a horizontal line array or spherical array, conventional beamforming has been widely used for detection and bearing estimation of a target. The highest beam yields the target bearing if the dominant arrivals of the signal are contained in one beam, as when the target look direction is near the broadside of the horizontal array. When the source is near an end fire direction, the multipath arrivals may spread the signal over several beams causing signal gain degradation and bias in direction estimation.

A horizontal line array is the preferred means for estimating the bearing of an underwater object emitting acoustic signals in an ocean waveguide. The array needs to have an aperture of typically greater than 5–10 wavelengths in order to provide a sufficient bearing resolution and processing gain. At ranges where the signal distortion due to random acoustic media has not completely destroyed the relative signal phase, the array aperture can be large and for this reason, a line array is most practical. While the bearing of the source (also referred to as target) can be estimated by conventional beamforming, it is also highly desirable to be able to estimate the range of the source.

To accomplish the latter objective, a modification of conventional beamforming has been proposed assuming a spherical curvature wave front for the emitted acoustic signal. This is called range-focused beamforming, as the curvature wave front depends on the source range. To estimate the target range, range-focused beamforming is applied to data assuming several hypothesized target ranges. The beam outputs with the highest intensities are used to estimate the target range. Range estimation is limited to a target at near broadside directions and at ranges less than the Fresnel zone. This approach breaks down at near end fire directions.

Another approach to sonar array processing is the so-called matched-field processing which was originally proposed for a vertical line array and has later been extended to a horizontal line array. Matched-field processing assumes a signal propagation model based on the physics of acoustic wave propagation in the ocean, which requires environmental acoustic inputs such as the sound speed profile in the water column, the bottom depth (or bathymetry for a range dependent model) and bottom sound speed, density and attenuation. For a hypothesized target range and depth, the modeled acoustic field (called the replica field) on a vertical array is correlated with the received data. The outputs are used to create a range-depth ambiguity surface where the peak is used to localize the target. Matched-field processing has been extended to a horizontal line array where for a given target bearing (as determined from conventional beamforming), one can search for target range and depth.

One critical issue for matched-field processing, which concerns both the vertical and horizontal array, is the environmental mismatch, which occurs when the environmental inputs used to create the replica field are uncertain and may incur errors. The results of environmental mismatch include range and depth errors which, depending on the nature of the mismatch, may be large.

Another way to perform the matched-field processing is matched-mode processing wherein the correlation of the replica field with the data field is carried out in the normal mode space. In acoustic propagation in an ocean waveguide, the field may be represented as a sum of many normal modes; the normal modes are eigen-functions of the waveguide, such as, for example, sinusoidal waves are eigen-modes of a guitar string. Using the mode expressions, the ability to estimate the range and depth for a vertical and horizontal line array can be quantitatively modeled.

In view of the fact that all the sonar array processing software has been developed based on conventional beamforming for a horizontal line array, a variation of matched field processing has been proposed using the preformed conventional beams as the input data. The beam data are correlated with the conventional beams formed from the replica field (the replica beams). This is called matched-beam processing. Matched-beam processing is equivalent to matched-field processing if all beams are used; this follows from the convolution theorem as conventional beamforming is a wave number transform of the sensor data. Based on the beam domain algorithm, a post sonar array processor has been proposed as an appendix to the conventional beamforming processor to estimate the target range and bearing.

Matched-beam processing can be interpreted as a beamforming technique as discussed below. Based on this formulism, it is unified with range-focused beamforming and shown to be a natural extension of the range-focused beamforming. As such, the processor performance analysis can be handled the same way as for range-focused beamforming.

While matched field processing has shown the capability to localize a source, in practice there often exist loud interference sources (e.g., surface ships) producing sidelobes in the ambiguity surface that may mask the target source or influence the source location. Adaptive signal processing has been developed (in the context of plane wave arrivals) to null the interference. But the performance is limited by signal mismatch between the data and model, and beam spreading due to multipath arrival. For example, the dominant mode rejection approach requires the interference signal (the dominant mode) to be orthogonal to the target signal, which is not always true in practice.

SUMMARY OF THE INVENTION

This invention employs two adaptive signal processing approaches to suppress the interference. One is to use the depth discrimination based on the fact that the submerged source couples to different normal modes than the surface interference. The other is to process the target source and interference using different beam sub-spaces assuming that they are detected on different beams by conventional means. The latter is the reduced beam space processor.

An apparatus for processing passive acoustic signals received on a horizontal line array that were either emitted from an underwater object or echo returned from an object, is proposed to display a radar-like range-bearing image of the object, thereby showing the location of the object relative to the receiver horizontal line array. The range-bearing images can be created at different water depth to search for an underwater object in a three-dimensional space. The method includes receiving an acoustic signal from the target, determining a beam covariance matrix, determining a replica field for a range-bearing of the target, determining a replica beam from the replica field; and processing the beam covariance matrix and the replica beam to determine range-bearing ambiguity surface and estimate depth ambiguity for selected peaks of the ambiguity surface.

The range-bearing image is focused to some particular depth. When focused to the depth of an underwater source, it has the capability of suppressing ship-radiated or surface-generated noise thereby increasing the detectability of the underwater source (henceforth called "target") under a noisy shipping condition or foul weather condition. Signals can be passive signals radiated from the source or echo returns from an active source. The depth discrimination is achieved by exploiting the difference in the coupling of the acoustic source with the sound channel (acoustic normal modes) between sources of different depths; the difference is prominent in a downward refractive sound speed profile.

In one aspect, the present invention provides an apparatus for processing acoustic signals received on a horizontal line array for creating range-bearing images of a target, the apparatus includes a receiver array for receiving an acoustic signal from the target; a processor for determining a beam covariance matrix; the processor determining a replica field for a range-bearing of the target, the processor further used for determining a replica beam from the replica field. The processor further processes the beam covariance matrix and the replica beam to determine range-bearing ambiguity surface and estimate depth ambiguity for selected peaks of the ambiguity surface. The apparatus further comprises a display device for displaying a radar-like image of the target. The radar-like image is preferably created with instantaneous data, the data being continuously updated. The acoustic signals from the target are preferably passive signals radiated from the target or echo returns from an active source. In the above apparatus a sub-space of the beam covariance matrix is used in a target-search direction, thereby resulting in a reduced number of computations. The replica beam is determined from the replica field by transforming data from the target from a phone space to a beam space. The apparatus is preferably configured for passive searching of an underwater object and for active searching of an underwater object.

In another aspect, the present invention provides a method for processing acoustic signals received on a horizontal line array for creating range-bearing images of a target, the method comprising: receiving an acoustic signal from the target; determining a beam covariance matrix; determining a replica field for a range-bearing of the target; determining a replica beam from the replica field; processing the beam covariance matrix and the replica beam using a beam sub-space adaptive processor; producing a range-bearing ambiguity surface to determine the source range and bearing; and producing a depth ambiguity function to estimate the source depth for selected peaks of the ambiguity surface. A sub-space of the beam covariance matrix is preferably used in a target-look direction, thereby resulting in a reduced number of computations, a separation of the target sub-space from the interference sub-space, the interference contribution to the target sub-space being suppressed by peak-to-sidelobe-ratios provided by conventional beamforming. The replica beam is preferably determined from the replica field by transforming data from the target from a phone space to a beam space. Range errors due to environmental mismatch are preferably minimized by a proper choice of mode numbers, the choice being determined by the wave number spread of normal modes based on a database of sound speed profiles for a given area. The range estimation is preferably calibrated using, ocean-moving vehicles, such as for example, ships, of opportunities as a source. Range and bearing estimation of the source is preferably obtained initially using a hybrid processor based on a frequency independent set of weighting coefficients without a precise knowledge of depth of the source. The weighting coefficients represent mode amplitudes at a frequency lower than the frequency band of interest. Range estimation is further refined after depth is estimated using the initial range estimation.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and apparatus.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE EXEMPLARY EMBODIMENTS

In the drawings, like or similar elements are designated with identical reference numerals through the drawings, and the various elements depicted are not necessarily drawn to scale.

Figure 1:
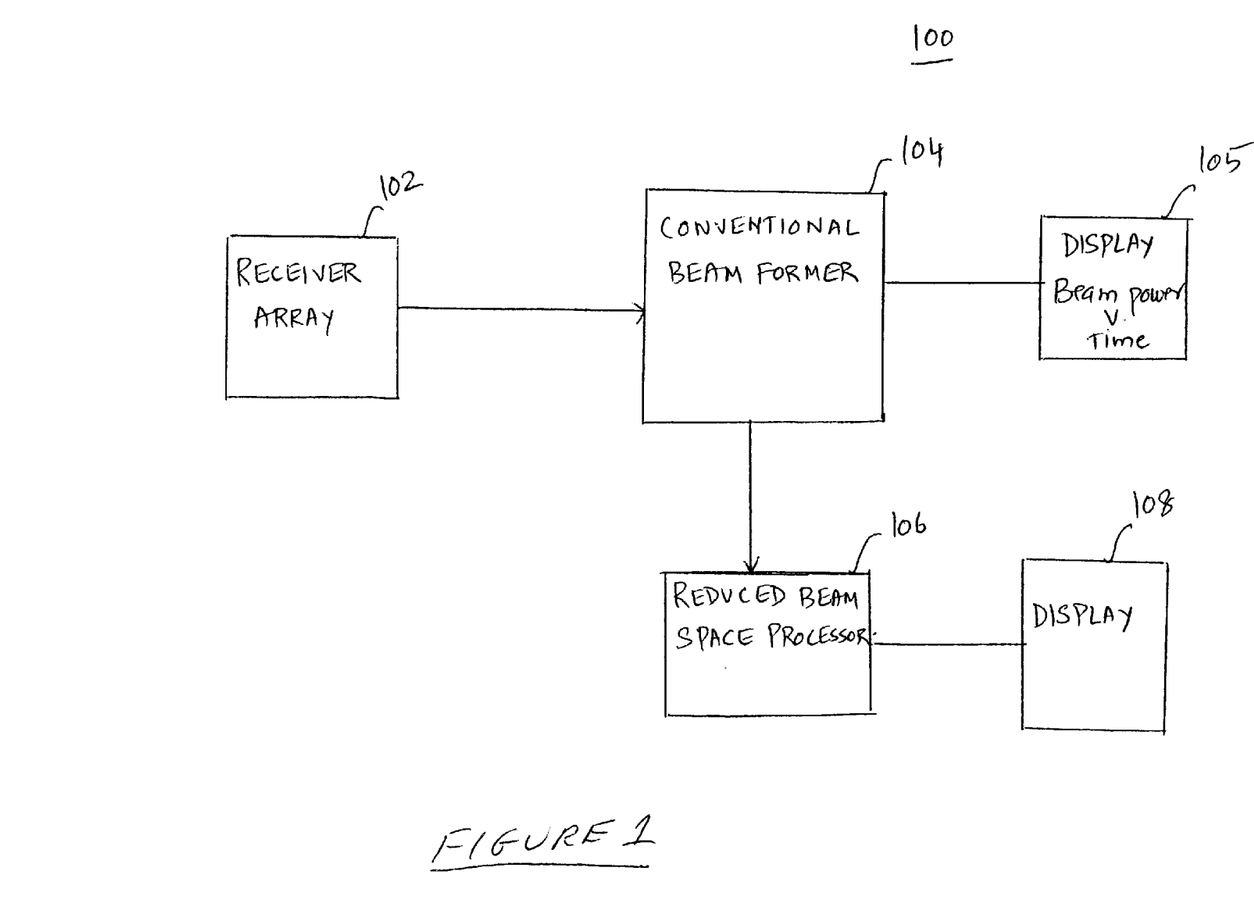
FIG. 1 shows a reduced beam space processor in relation to the existing conventional beamforming processor.

Referring now to FIG. 1, there is shown an exemplary schematic of the reduced beam space processor in relation to the existing conventional beamforming processor. The overall schematic 100 is shown to include a receiver array 102 for producing hydrophone data. The receiver array 102 may be a horizontal array, a vertical array, or an array of an arbitrary type. Matched beam processing is a passive technique which starts with the conventional beamforming from a conventional beamformer 104 which nominally outputs conventional beam power plotted against time on a display 105.

A reduced beam space processor 106 described in the present invention, utilizes the data derived by the conventional beamformer 104 and displays a radar-like range-bearing image of the object, thereby showing the location of the object relative to the receiver horizontal line array. The image is displayed on the display device 108.

Matched-beam processing was introduced as a beam domain implementation of matched field processing. When matched beam processing is compared with conventional processing using either plane wave beamforming or range-focused beamforming, using a beam space representation, matched-beam processing may be shown to be analogous to range-focused beamforming; the difference lies in the beam steering vector. From this point of view, matched-beam processing is more appropriately called matched-beam beamforming (MBB) and carries with it a concept of operation that is more like range-focused beamforming than matched field processing. Matched field processing focuses predominantly on range-depth localization. Matched beam beamforming is a natural extension of range-focused beamforming that includes the physics of signal propagation in an ocean waveguide.

For MBB, the steering vector uses a beam domain expression of the replica field, which is calculated using a propagation model (such as a normal mode model). By incorporating the sound propagation in a sound channel, the reduced beam space processor (RBSP) 106 is capable of target range estimation not only in near broadside directions but also in near end fire directions. The RBSP 106 is also capable of some depth discrimination between the underwater target and surface clutter; the ability to discriminate in depth depends on the array aperture and acoustic wavelengths relative to the water depth.

The beam domain Minimum Variance Distortionless Response (MVDR) is expressed as $$B^{MBDR}(\theta_s) = \frac{1}{a^H(\vartheta)Rb^{-1}(\vartheta)a(\vartheta)} \quad (1)$$

where Rb is the covariance of the conventional beam data;

$$Rb = \langle b_{data} b_{data}^H \rangle \quad (2)$$

where the superscript H denotes the Hermitian conjugate. The conventional beam data is denoted as $b_{data}$ having an expression in the frequency domain as follows:

$$b_{data}(\theta_i) = \sum_n e^{-ikx_n \cos\theta_i} p_{data}(x_n); \quad (3)$$

The beam steering vector a is related to the replica field by $$a(\theta_i) = b_{rplc}(\theta_i) = \sum_n e^{-ikx_n \cos\vartheta_i} p_{rplc}(x_n, \vartheta_s), \quad (4)$$

which can be written in matrix-vector form as a=T p, where T is a M×N matrix for M beams and N sensors; the element of the matrix T is the exponential term in the above equation. Likewise, one has $b_{data}$=T $p_{data}$. The beam covariance matrix is related to the phone covariance matrix R by Rb=$T^H$RT. The beam steering vector is normalized to one. One can form uniformly spaced beam in the sinθ domain or uniformly spaced beam in the beam angle θ domain. If one forms beam uniformly distributed in beam angle, the normalization is given by $$\sum_j a^H(\theta_j)a(\theta_j)\sin\theta_j = 1$$

where θ is measured from one end of the horizontal line array.

Equation (1) involves three different angles: $\theta_S$ is the steering/search angle at the look direction, and $\theta_T$ is the signal angle (bearing) and $\theta_i$ is the beam index used in matrix multiplication. For a plane wave beam-space steering vector, a is the conventional beam output for a plane wave arriving at the angle $\theta_S$. It has a beam width sin($\theta_1-\theta_S$)≈1/N. Thus the elements of a are small except for the ±w beams adjacent to the signal-look beam. This is particularly so for a large aperture HLA where the sidelobe levels are low. We then find that in this approximation, only the 2w+1 beam sub-space of the beam covariance matrix will contribute to the MBDR output at angle $\theta_S$. Therefore there is no need to process the entire beam space; a beam sub-space processor will be adequate. For matched-beam processing, one uses the same formulation, except that w needs to be large enough to cover the beam spreading at end fire directions due to multipath arrivals. For example, if one forms 181 beams for 180 degrees, w=10 will be sufficient.

The reduced beam space processor processes a sub-space of the beam covariance at the target look direction. The processor has the following form $$B^{MBDR}(\theta) = (\hat{a}^H Q^{-1} \hat{a})^{-1}, \quad (5)$$

where â is a sub-space vector of a, of dimension 2w+1, and Q is a sub-matrix of Rb, of dimension (2w+1)×(2w+1) indexed around the signal-look directions. For w=10, the matrix inversion for a 21×21 matrix is much faster than the inversion of a matrix of dimension N×N in the element space when N>>21. Note that $Q^{-1} \neq TR^{-1}T^H$. One should take the inverse of the 21×21 matrix Q and not take the inverse of the full Rb matrix and then pick the 21×21 sub-matrix.

Matched beam beamforming is a natural extension of range-focused beamforming (FRB). To see this, we use a replica field for range-focused beamforming $$p_j^{Rplc} = \sqrt{\frac{2\pi}{k}} \exp(-jkr_j)/r_j^n \qquad (6)$$

where $r_j$ denotes the range from the jth sensor to the replica source; n=1 for spherical wave and n=½ for cylindrical spreading. For a proper treatment of the signal propagation in a waveguide, we use the normal mode expression for signal propagation, $$p_j^{Rplc} = \sum_m \sqrt{2\pi} \exp(-jk_m r_j)\psi_m(z_j)\psi_m(z_s)/\sqrt{k_m r_j} \qquad (7)$$

The differences between the conventional beam processor 104 and the reduced beam space processor 106 lie in the additional mode depth functions $\psi_m(z_j)\psi_m(z_S)$ and the mode dependent wave number $k_m$ in Eq. (7). Comparing Eq. (6) with Eq. (7), one finds it is more appropriate to set n=½ than n=1 when using range-focused beamforming.

In Eq. (7), $z_j$ is the depth of jth sensor on the horizontal array and can be determined by the array depth and cant angle. The variable $z_S$ is the depth of the range-bearing ambiguity surface. By choosing $z_S$ appropriately, one can differentiate the response of the target from that of the surface clutter (depth discrimination).

Processing Concept and Schematics

Figure 1A:
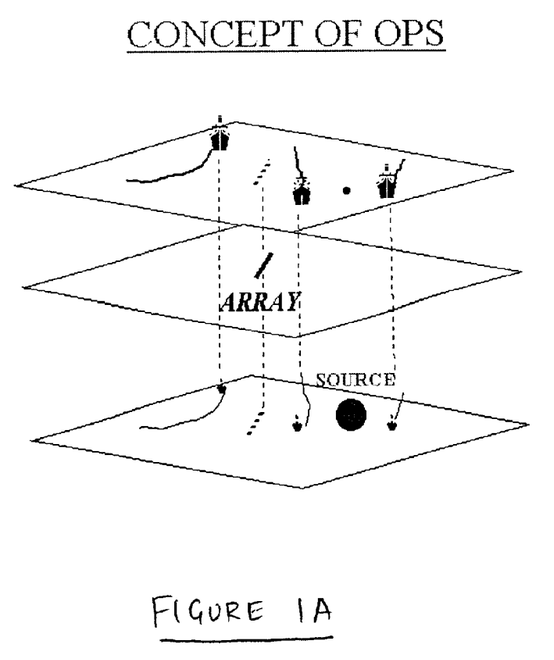
FIG. 1A is a three dimensional view of an underwater source and surface ships.
Figure 1B:
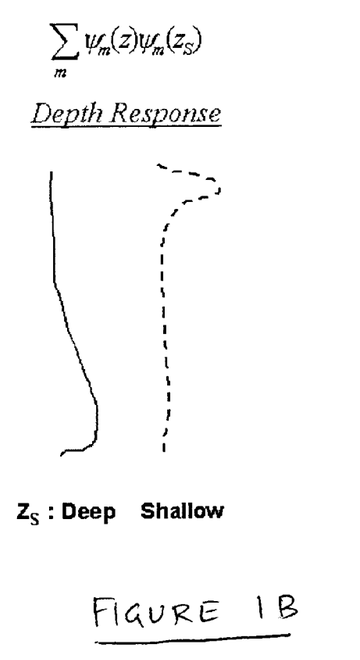
FIG. 1B illustrates a depth response curve of the surface ship and the underwater source as shown in FIG. 1A and wherein the output intensity of the source and surfaces are represented by the size of the object at the corresponding plane.

The reduced beam space processor 106 is used to create a passive sonar image (a range-bearing ambiguity surface) showing the X-Y location of the source at the depth of the source. A three-dimensional view of the source, the receiver line array and the ocean surface is shown in FIG. 1A. We assume a given source depth, $z_S$, which will be the ocean bottom depth in the case of a lost flight recorder. For this case, $\theta_S$ in Eq. (1) will be the X-Y coordinates or the range-bearing of the source $[r_s, \Theta_s]$. The range, bearing and depth are used to calculate the replica pressure field using Eq. (7).

Figure 2:
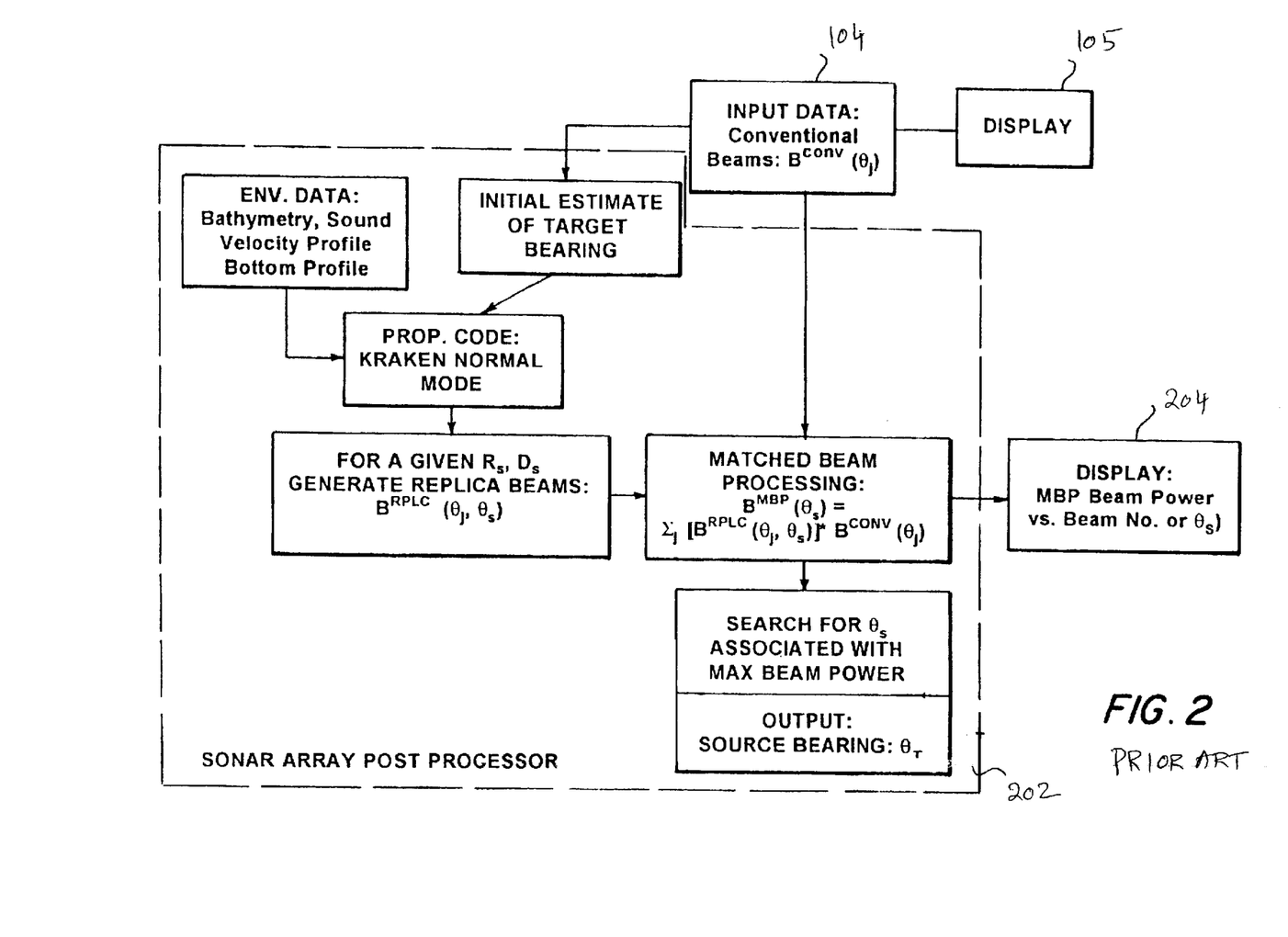
FIG. 2 Schematic diagram of the Sonar Array Post Processor.

FIG. 2 shows a schematic of a Sonar Array Post Processor using Bartlett beam correlation. FIG. 2 specifically illustrates a schematic for sequential iterative search technique to track the target bearing and range. The beam widths using a Bartlett processor 202 are large in both bearing and range. Also, the sidelobe leakages from a surface noise (clutter) can be significant which introduce false targets to the ambiguity surface.

Figure 3:
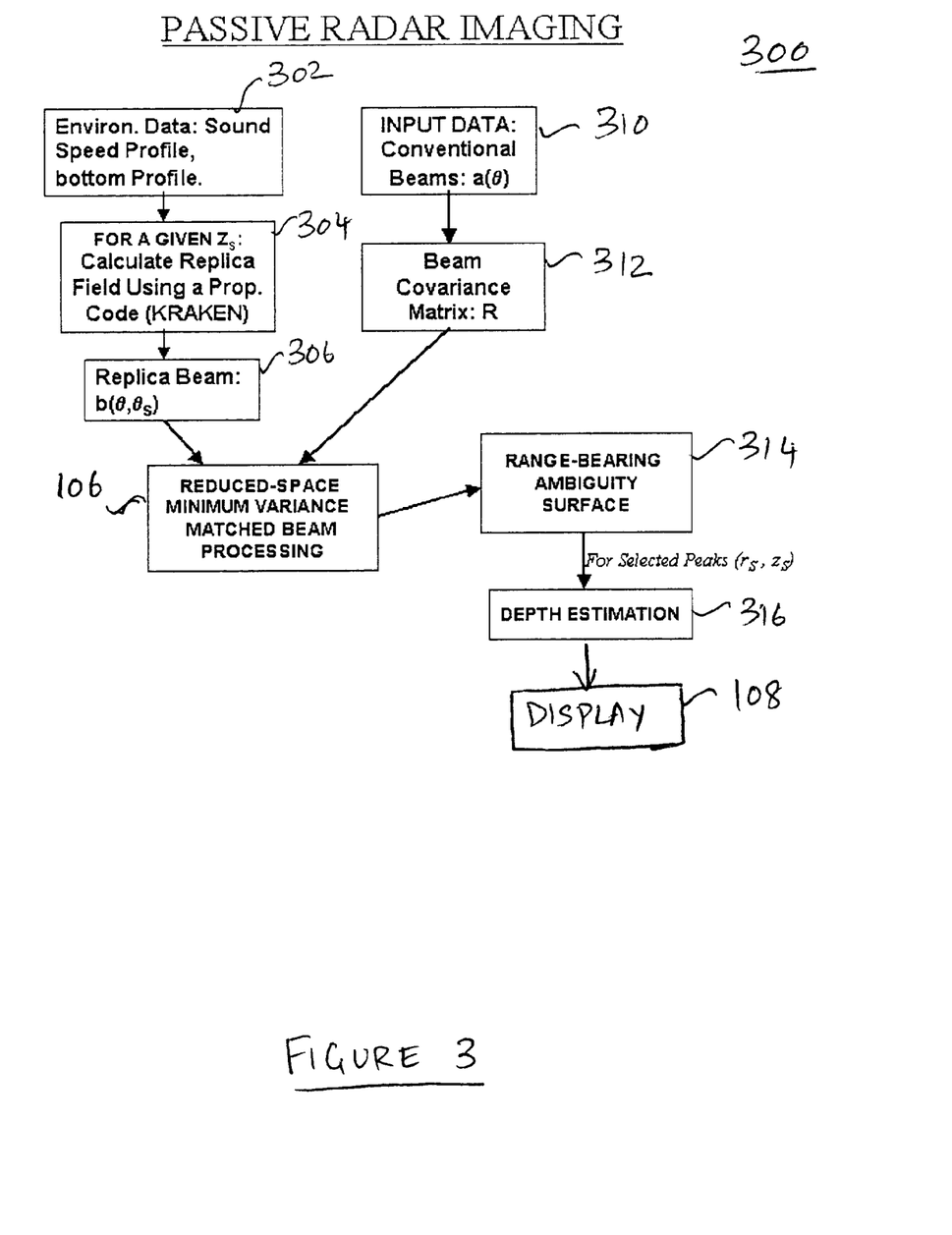
FIG. 3 illustrates a schematic for reduced beam-space adaptive matched beam processing for Passive sonar imaging in accordance with the present invention.

FIG. 3 illustrates a schematic 300 to determine range-bearing ambiguity surface using the reduced beam-space processor in accordance with an exemplary embodiment of the present invention. The input data as shown at 310 are the conventional beam outputs used to calculate the beam covariance matrix averaged over tens of data samples as shown at 312. Step 302 uses the environmental data, i.e., the sound speed profile in the water column and the bottom sound speed profile, density and attenuation to calculate the replica field for a range-bearing of the source at an assumed depth source using a sound propagation model such as the KRAKEN code at step 304. At step 306 Replica beam is obtained from the replica field by a matrix multiplication, which transforms the data from the phone space to the beam space. Then, the data beam covariance matrix and the replica beams are processed using the reduced beam-space minimum variance matched beam processor (also referred to as "reduced beam space processor") 106. The output of the reduced beam space processor is the range-bearing ambiguity surface as shown at step 314. The coordinates of the peaks of the ambiguity surface are used to estimate a depth 316 associated with the peak for consistency check as shown next in FIG. 4.

The improved beam width using the reduced beam space processor 106 and the reduced sidelobe leakage levels from the surface noise (clutter), which are two unique features of the new processors, are desirable to create radar-like images of the target and the clutter at their corresponding depth planes. An example of the radar-like image is given in FIG. 5A for the target where the sidelobes from ships are suppressed. For the same data, the range-bearing ambiguity surface obtained using the Bartlett matched-field/matched-beam processing would show a main lobe area several times larger and would show other peaks associated with surface ships.

Figure 4:
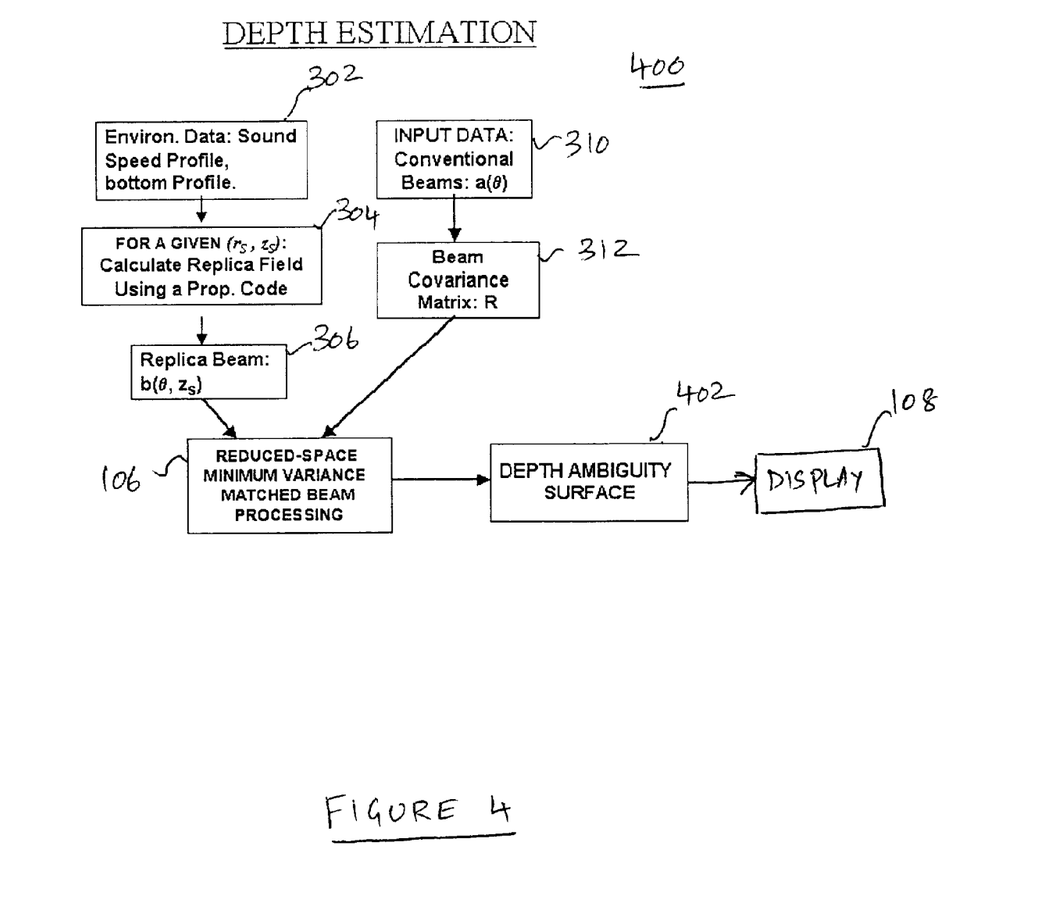
FIG. 4 illustrates a schematic for reduced beam-space adaptive matched beam processing for Depth estimation in accordance with the present invention.
Figure 5A:
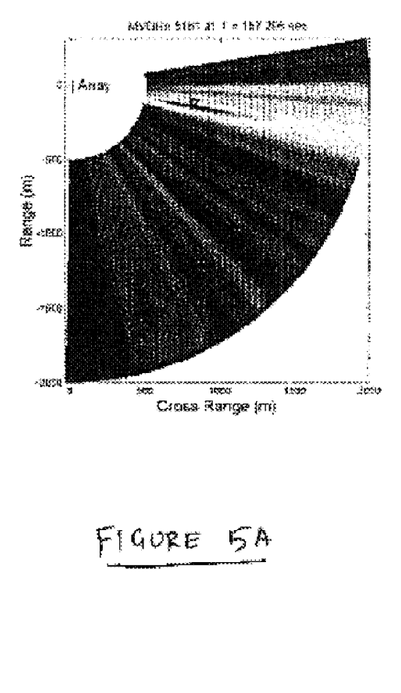
FIG. 5A illustrates a passive radar-like image of an underwater object wherein the array is located at the origin (upper-left corner), P denotes the location of the peak of the ambiguity surface.
Figure 5B:
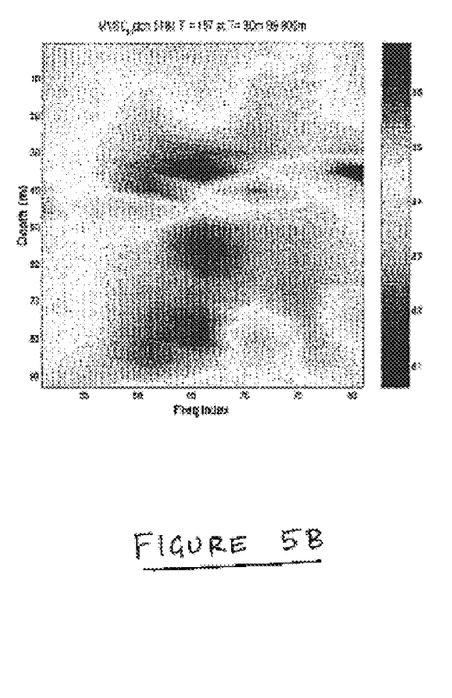
FIG. 5B illustrates the depth ambiguity as a function of frequency for the peak in the range-bearing ambiguity surface as shown in FIG. 5.

For a potential peak in the passive sonar radar image 314, one can estimate the depth associated with the peak to determine if the peak is in fact the target one is looking for. To estimate the depth of the peak, one uses Eq. (1) where $\theta_S$ is $z_S$ with $[r_s, \Theta_s]$ being the coordinates of the peak. FIG. 4 illustrates a schematic 400 to determine the depth ambiguity surface and estimating depth; the process parallels that of FIG. 3 except for the difference in the Replica field. The input data as shown at 310 are the same conventional beam data used to calculate the beam covariance matrix averaged over tens of data samples as shown at 312. Step 302 uses the environmental data, i.e., the sound speed profile in the water column and the bottom sound speed profile, density and attenuation to calculate the replica field at a fixed range-bearing of the source as determined from the peak of the range-bearing ambiguity surface 314, using a sound propagation model such as the KRAKEN code at step 304. At step 306 Replica beam is obtained from the replica field by a matrix multiplication, which transforms the data from the phone space to the beam space. The data beam covariance matrix and the replica beams are processed using the reduced beam space processor 106. A depth ambiguity 402 is displayed as a function of the depth and acoustic frequency of the signal. The reason for doing this is that the depth ambiguity function is sensitive to the frequency used. As an example, the depth ambiguity surface for the peak in FIG. 5A is shown in FIG. 5B; it indicates that the target depth is in this case at ~30 m. Note that the depth ambiguity function (the ability to discriminate depth) is a function of the acoustic wavelength relative to the water depth. One needs to select the proper frequencies for depth estimation. The rule for selecting the proper frequency band is that the "effective vertical aperture" of the horizontal line array should cover several (vertical) wavelengths for the chosen frequencies. The "effective vertical aperture" of a horizontal line array is usually a third to a sixth of the horizontal array aperture. If the frequency is too low, the horizontal line array does not have a sufficient aperture to resolve the depth and if the frequency is too high, there will be many sidelobes, and source localization may be sensitive to environmental mismatch.

For a vertical array, it has been shown that a minimum variance processor yields a higher resolution in depth ambiguity than the Bartlett processor. The reduced beam space processor 106 of the present invention uses the same principle but applied to a horizontal array. For a horizontal line array, even though it may have higher sidelobe levels due to its limited "effective vertical aperture", it is shown that the sidelobes do not extend to the surface depth and therefore have a minimal effect on the ability to discriminate against surface clutter. The sidelobe leakage from the surface clutter to the depth of the target is less than the Bartlett processor.

In practice, ample opportunities exist to use known surface ships and controlled underwater sources to calibrate the processor performance for range and depth estimation. Collecting such data in advance will create an invaluable database. One can also use the known sources to calibrate the environmental parameters using the simulated annealing or genetic search algorithm to find the parameters that yield the highest correlation between the data and the replica beams.

The reduced beam space processor 106 improves the processing speed significantly (e.g., reduction by orders of magnitude). Consider an array of N phones and M beams, e.g., N=200 and M=181, i.e., a beam at each degree. The MVDR in the element space requires an inverse of a N×N matrix. Likewise, in the beam space, if all beams are used, it requires an inverse of a M×M matrix. The matrix inversion takes a number of computations proportional to the square of the matrix dimension. The preferred embodiment uses only a subspace of the beam covariance matrix involving only beams (e.g., ±10 beams) in the target-look directions. The result is a significant reduction in the number of computations. As an example, the reduced beam space processor 106 using only 20 beams requires ~1% of the calculation time compared with that using the element space MVDR for an array of 200 phones.

By using only target-look beams, the beam space filter eliminates the contribution of the interference and noise originating from the non-target-look directions, resulting in improved performance (robustness in the outputs). The beam covariance is separated into a signal beam sub-space containing beams around the target look directions, and a noise/clutter sub-space. So long as the interference and target are separated in the conventional beam plot, the leakages from the interferences to the target beam sub-space are suppressed in the beam domain by the conventional sidelobe-to-peak ratios. For an array with 20–30 wavelength aperture, the peak-to-sidelobe ratio suppression is >15–20 dB; the larger the aperture the higher the suppression. As a result, for the beam covariance sub-matrix in the target direction, the contribution of the interference as measured by the eigenvalues associated with interference has been suppressed compared with the eigenvalues associated with the target. Therefore, the target beam covariance sub-matrix will be dominated by the target eigenvector. In contrast, the largest eigenvalue of the element-space covariance matrix is often dominated by the interference, which is often much larger than eigenvalue associated with the target. Array processing, such as the dominant mode rejection algorithm, has been proposed to remove the interference (the largest eigenvector). It requires a clear separation of the target eigenvector from the interference eigenvector to avoid signal energy loss, which is not always possible. (The target eigenvector should be orthogonal to the interference eigenvector, but is not so in reality.) One thus sees that the beam domain approach is more robust in the identification of the target eigenvector and in interference rejection.

If one forms uniformly spaced beams in the $\cos \Theta$ plane, a fixed number of beams in the target look directions could be used irrespective of the look angle. The drawback of this choice is that there are not enough beams in the end fire direction. The alternative is to form beams uniformly spaced in angle (e.g., a beam at each degree). For the latter case while it may be simpler to use a fixed number of beams for all look angles, it is desirable to use a variable number of beams to minimize computations and improve performance. The minimum number of beams required will depend on the azimuth angle. A small number of beams will be adequate for near broadside directions. A large number of beams will be required for near end fire directions since the end fire beam is wider than the broadside beam.

The principle in selecting the beams is that beams must cover the signal arrival directions. A rectangular beam window filter is preferred for the beam selection. Note that the beam widow is generally not always centered at the target look direction. For example, at the end fire it can only fall on one side (i.e., the side toward the broadside direction). Also, since the beam width varies with frequency, the beam window width is also a function of frequency. The beam steering angle must be properly normalized when a variable size of beam window is used.

The following algorithm is used to determine the beam window (filter). The algorithm assumes that the signal propagating in a sound channel is confined to grazing angles between $\pm \Phi_0$; signals with grazing angle $>\Phi_0$ are assumed attenuated by bottom. For example, $\Phi_0=20°$.

Assume a signal arriving at a bearing $\Theta$ measured from one end of the horizontal line array (HLA), with a depletion/elevation (D/E) angle $\phi$, the angle between the signal and the HLA axis, $\Theta_b$, is determined by $$\cos \Theta_b = \cos \phi_0 \cos \Phi \cos \Theta + \sin \phi_0 \sin \phi \quad (8)$$

where $\phi_c$ is the cant angle of the HLA. For a signal with D/E angle confined between $\Phi_0$ and $-\Phi_0$, the target-looking beams are confined to beam indices given by $$\cos \Theta_1 = \cos \phi_c \cos \Phi_0 \cos \Theta - \sin \phi_0 \sin \Phi_0$$

$$\cos \Theta_2 = \cos \phi_c \cos \Phi_0 \cos \Theta + \sin \phi_0 \sin \Phi_0 \quad (9)$$

The upper and lower bound of the beam indices are used to build a (rectangular) beam window. To account for the exact propagation conditions, one can refine the beam window using the beam width of the replica beams.

One notes that there are other ways of implementing the reduced beam space processor, but they yield inferior performance in clutter suppression—they yield higher sidelobe levels. For example, instead of using $Q^{-1}$, one could use sub-matrices of $T^H R^{-1} T$ or $(T^H RT)^{-1}$, but note that $Q^{-1} \neq (T^H R^{-1} T)_{IJ}$ and $Q^{-1} \neq ((T^H RT)^{-1})_{IJ}$, where IJ denote projection into the beam sub-space. The preferred way is to use the inverse of the sub-matrix Q as in Eq. (5).

To calculate the replica field and the replica beams, matched beam processing requires a reasonably accurate sound speed profile, bottom bathymetry, and bottom properties. These inputs are used to calculate the mode wave numbers and mode depth functions at various depths. There arises the issue of environmental mismatch, i.e., the issue regarding the source localization error due to the error in the environmental data.

In one embodiment, the following approach is used to estimate and control the range error due to environmental mismatch. For a given area, a database for the sound speed profiles for different seasons can be obtained and used to determine the spread of the mode wave numbers due to the variations in the sound speed profile. Noting that range localization is given by the constructive interference between normal modes, one can estimate the range error associated with a pair of modes by:

$$\Delta r = \frac{\Delta(k_i - k_j)}{k_j - k_i} r, \qquad (10)$$

where i,j are the mode numbers, and $\Delta k_i$ denotes the difference (hence the error) in the i-th mode wavenumber between two (the incorrect and correct) sound speed profiles. If one desires a range error less than $\Delta$, the recipe is to use only these modes which satisfy the following condition $$|\Delta(k_i - k_j)|/|k_i - k_j| \leq \Delta/r_{max}. \qquad (12)$$

Since low order modes are usually less sensitive to environmental mismatch, one can limit the number of modes to those which satisfies $$|\Delta k_i|/|k_i| \leq \Delta/r_{max}. \qquad (13)$$

In most cases, this means that some higher order modes should be dropped in the calculation of the replica field. The same rule applies to mode wave numbers due to different bottom parameters.

To create the radar-like image of the source in range-bearing, a knowledge of the source depth is required. In many situations, the source depth is known, e.g., the ocean depth. In other cases, when the source depth is not known, it can be searched as described above. There is a way for a quick estimation of the location (range and bearing) without a precise knowledge of the source depth using a hybrid processor described below. The price paid is less resolution and array gain. The hybrid processor is a modification of Eq. (7) to minimize the sensitivity to target depth and perform a (initial) range estimate. Bearing is cued by conventional or adaptive plane wave beamforming.

We note that in Eq. (7), $k_m$ and $\psi$ are functions of frequency. Expressing Eq. (7) as $$p_j^{Rplc} = \sum_m \sqrt{2\pi} \exp(-jk_m r_j) \psi_m(z_j) \alpha_m / \sqrt{k_m r_j}, \qquad (14)$$

one finds that $$\alpha_m = \psi_m(z_s); \qquad (15)$$

this is the only term that depends on the source depth. For the hybrid processor, $\alpha_m$ will be chosen to be independent of frequency and not explicitly dependent on the target depth. Note that in Eq. (14) if one replaces both $\psi_m(z_j)\alpha_m$ by a constant, it parallels closely Eq. (6) of range-focused beamforming. In that case, the difference between Eqs. (6) and (14) is only that more wave numbers are used in Eq. (14). (Using more than one wavenumbers could result in more robustness and stability for range-focused beamforming.) Equation (14) is thus called a hybrid formula between range-focused beamforming and matched-beam beamforming, and is consequently less sensitive to environmental mismatch. A recipe for $\alpha_m$ is to use the right hand side of equation (15) at a frequency lower than the frequency band.

Since the target can be assumed not too far, one can often assume a range independent environment for source localization. In that case, it is computationally advantageous to pre-calculate the mode wave numbers, mode depth functions and pre-determine the number of modes to be included in the calculation of the replica field. The pressure field on the HLA will be calculated in real time using real time input for the array cant angle. The mode calculation increase the computation load by 40% over range-focused beamforming and is doable in real time.

The performance of range-bearing localization depends to some extent also on the range-bearing search grid size. Smaller grid size increases the total number of grids to be searched and correspondingly the computational load. Adaptive matched beam processing provides a high resolution in both bearing and range, hence fine beam spacing and range steps may be required in order not to miss the signal. If the grid size used in the search space is larger than the beam resolution in bearing and range, the target could be missed because the replica will be under-sampled in the search space. On the other hand, one notes that environmental mismatch places a limit on the minimum grid size beyond which the performance will not improve due to environmental mismatch. The compromise of the two is used to determine the proper grid size. The grid size can be estimated using simulation data which includes the expected environmental mismatch.

A minimum variance processor, being a high resolution processor is normally sensitive to gird mismatch when the search grid is too coarse and target is not on the grid. In that case, the signal power can degrade significantly. The reduced beam space processor reduces the sensitivity to grid mismatch by the use of a beam filter. This can be demonstrated using simulated data. One can illustrate this using the Bartlett processor which states that the correlation of the beam data with the replica beam is the same as the correlation of the element data with replica data when all beams are used. Now if one includes a beam filter in the correlation of the beam data with the replica data, the result is equivalent to convolve the matched field beam output with a low pass beam space filter. The result is a wider beam width for the main lobe and hence a reduced sensitivity to the grid mismatch error.

For the Bartlett processor 202, the main lobe is already wide enough and thus it is not necessary to use a beam filter. The beam filter is however, is an important element for the reduced beam space processor 106. Note that the sidelobe levels, which are low using adaptive processing, remain low and unchanged when convoluted with a low pass filter. The advantage of adaptive processing in suppressing sidelobes remains intact when a beam filter is used. The two features, the wider main lobe width and the low sidelobe level, are useful in practice when the processor 106 can afford a finite number of grids in the search space.

Figure 6:
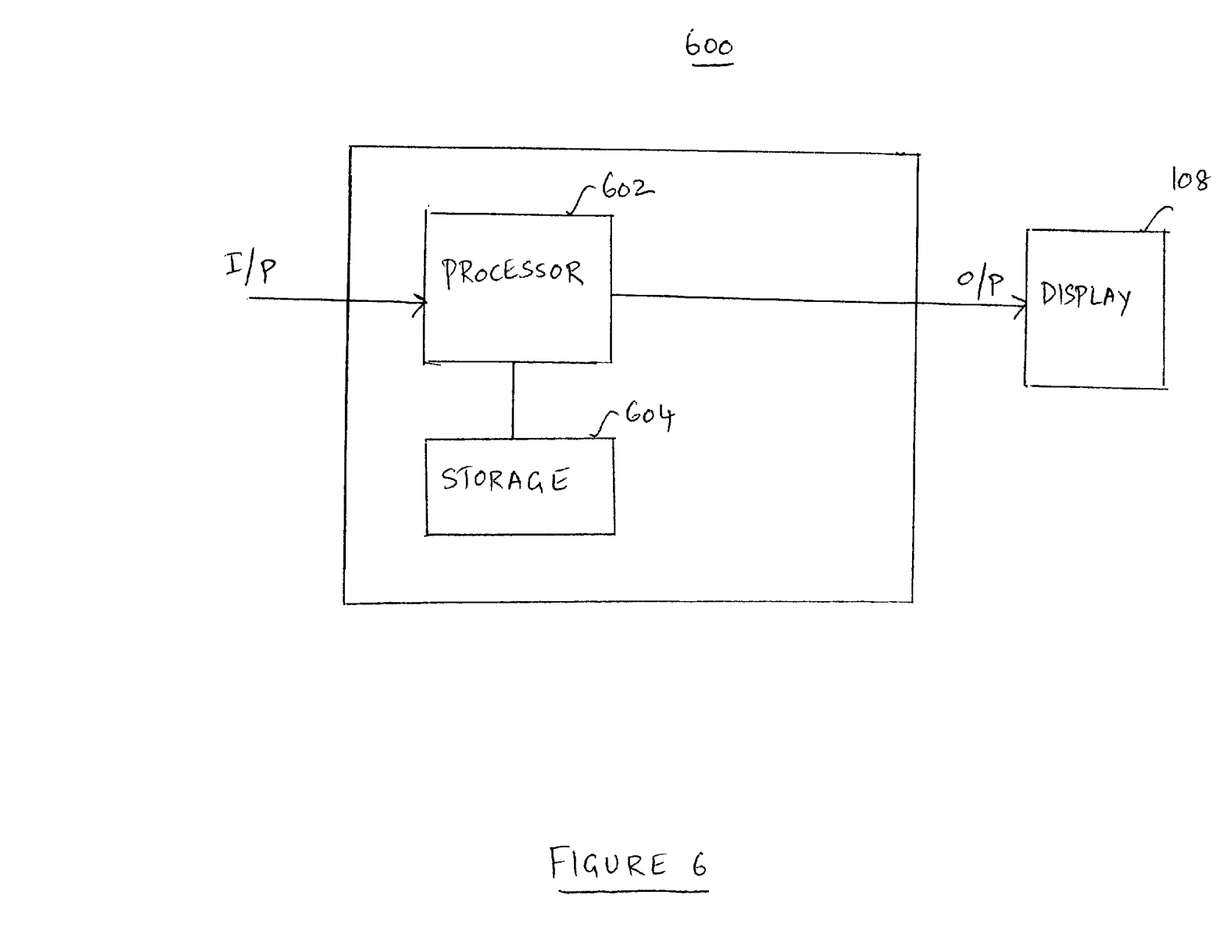
FIG. 6 illustrates a detailed schematic of a computer system for implementing the functions of a reduced beam space processor in another embodiment of the present invention.

FIG. 6 illustrates a detailed schematic of a computer system for implementing the functions of a reduced beam space processor in another embodiment of the present invention. The computer system 600 includes a processor 602 for executing functions performed by the reduced beam space processor. The computer system 600 also includes a storage unit 604. Information processed by the processor 602 is displayed on a display 108 (FIG. 1).

The present invention achieves significant advantages by modifying adaptive (minimum variance) processing for matched beam processing using a reduced beam space processor. It shows significant improvement in the array performance in terms of the range and bearing resolution and an improvement in suppressing surface clutter. This technique can be used, for example, for passive searching for a flight recorder or active searching of a ship wreckage that is lost in the ocean bottom under foul weather conditions when surface generated noise and/or nearby ship noise are non-negligible. For a potential target identified in the range and bearing ambiguity surface, the processor also displays the depth ambiguity of the target. This result can be used to check the consistency of the target localization.

While range can be estimated using range-focused beamforming, range estimation is limited to a target at a near broadside direction and at a (short) range comparable to the array aperture. Adaptive matched beam processing is capable of estimating the target range in all bearings and at extended ranges (limited only by the signal-to-noise ratio and potential environmental mismatch). While range can also be estimated by matched-field processing, the improvement due to the incorporation of adaptive (MVDR) processing into matched beam processing using only beams in the target-look directions provides several advantages.

It used a sub-space (reduced rank) processor with improved robustness.

It reduces the processing load and thus requires less processing time.

It yields narrow beam width in range-bearing and thus high resolution in source localization.

It reduces the presence of surface clutter resulting in an improved image and improved confidence in the identification of a target.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for processing acoustic signals received on a horizontal line array for creating range-bearing images of a target, the apparatus comprising:

a receiver array for receiving an acoustic signal from the target;

a processor for determining a beam covariance matrix;

said processor capable of determining a replica field for a range-bearing of the target, said processor being used for further determining a replica beam from the replica field; and said processor capable of further processing the beam covariance matrix and the replica beam to determine range-bearing ambiguity surface and estimate depth ambiguity for selected peaks of the ambiguity surface.

2. The apparatus as in claim 1, further comprises:

a display device for displaying an image of the target.

3. The apparatus as in claim 2, wherein said image is created with instantaneous data, said data being continuously updated.

4. The apparatus as in claim 1, wherein the acoustic signals from the target are passive signals radiated from the target or echo returns from an active source.

5. The apparatus as in claim 1, wherein only a sub-space of the beam covariance matrix is used in a target-search direction, thereby resulting in a reduced number of computations.

6. The apparatus as in claim 1, wherein the replica beam is determined from the replica field by transforming data from the target from a phone space to a beam space.

7. The apparatus as in claim 1 being configured for passive searching of an underwater object.

8. The apparatus as in claim 1 being configured for active searching of an underwater object.

9. A method for processing acoustic signals received on a horizontal line array for creating range-bearing images of a target, the method comprising:

receiving an acoustic signal from the target;

determining a beam covariance matrix;

determining a replica field for a range-bearing of the target;

determining a replica beam from the replica field;

processing the beam covariance matrix and the replica beam using a beam sub-space adaptive processor;

producing a range-bearing ambiguity surface to determine source range and bearing; and producing a depth ambiguity function to estimate source depth for selected peaks of the ambiguity surface.

10. The method as in claim 9, further comprising:

displaying an image of the target.

11. The method as in claim 9, wherein the depth ambiguity is estimated by using coordinates of peaks of the ambiguity surface.

12. The method as in claim 9, wherein said image is created with instantaneous data, said data being continuously updated.

13. The method as in claim 9, wherein the acoustic signals from the target are passive signals radiated from the target or echo returns from an active source.

14. The method as in claim 9, wherein only a sub-space of the beam covariance matrix is used in a target-look direction, thereby resulting in a reduced number of computations, a separation of the target sub-space from the interference sub-space, the interference contribution to the target sub-space being suppressed by peak-to-sidelobe-ratios provided by conventional beamforming.

15. The method as in claim 9, wherein the replica beam is determined from the replica field by transforming data from the target from a phone space to a beam space.

16. The method as in claim 9, wherein range errors due to environmental mismatch is minimized by a proper choice of mode numbers, said choice being determined by the wave number spread of normal modes based on a database of sound speed profiles for a given area.

17. The method as in claim 9, wherein range estimation is calibrated using ships of opportunities as a source.

18. The method as in claim 17, wherein a quick estimation range and bearing of the source is obtained using a hybrid processor based on a frequency independent set of weighting coefficients without a precise knowledge of depth of the source, said weighting coefficients representing mode amplitudes at a frequency lower than frequency band of interest.

19. An apparatus for processing acoustic signals received on a horizontal line array for creating range-bearing images of a target, the apparatus comprising:

means for receiving an acoustic signal from the target;

means for determining a beam covariance matrix;

means for determining a replica field for a range-bearing of the target;

means for determining a replica beam from the replica field; and means for processing the beam covariance matrix and the replica beam to determine range-bearing ambiguity surface and estimate depth ambiguity for selected peaks of the ambiguity surface.

20. The apparatus as in claim 19, further comprising:

means for displaying an image of the target.

* * * * *